United States Patent [19] [11] 4,167,247

Sons et al. [45] Sep. 11, 1979

[54] SPRAY CONTROL APPARATUS

[76] Inventors: Mack D. Sons, 9818 Green Ave. NW., Albuquerque, N. Mex. 87114; William F. Schlegel, 4437 Linden La. NE., Albuquerque, N. Mex. 87111

[21] Appl. No.: 867,365

[22] Filed: Jan. 6, 1978

[51] Int. Cl.[2] ........................ B05B 1/32; F16K 31/165

[52] U.S. Cl. ..................................... 239/455; 239/456; 239/570; 239/586; 251/61.1

[58] Field of Search ............... 251/61.1; 239/451, 455, 239/456, 533.15, 569, 570, 583, 586

[56] References Cited

U.S. PATENT DOCUMENTS

| | | | |
|---|---|---|---|
| 512,292 | 1/1894 | Haberle | 239/586 |
| 1,156,327 | 10/1915 | Stiers | 239/583 X |
| 2,989,282 | 6/1961 | White | 251/61.1 |
| 3,502,297 | 3/1970 | Wardrup | 251/61.1 X |
| 3,552,658 | 1/1971 | Sons | 239/456 |

*Primary Examiner*—Robert B. Reeves
*Assistant Examiner*—Andres Kashnikow
*Attorney, Agent, or Firm*—Robert W. Harris

[57] ABSTRACT

Apparatus for controlling the spraying of water or other fluid from a tank truck or other reservoir. A plurality of valves may be turned on with a single pump and individually turned off as desired during spraying operations, by the application of air pressure to control lines leading to the individual valves. The spray valves are individually adjustable for control of the flow rate, direction and pattern of spraying, and are so constructed as to minimize malfunctions from jamming of the valve mechanism experienced with other valves while spraying in a sandy environment.

6 Claims, 5 Drawing Figures

SPRAY CONTROL APPARATUS

BACKGROUND OF THE INVENTION

1. Field of the Invention

The invention relates to apparatus for controlling the spraying or other dissemination of a fluid from a reservoir, through the sequential opening and closing of a plurality of spray valves, and control of the flow rate and pattern of flow from each spray valve.

2. Description of the Prior Art

There are numerous applications in which it is necessary to continuously control the dissemination of a fluid from a reservoir, through control of the sequence, rate and direction of flow from a number of spray valves. There are, for example, numerous agricultural and contracting operations in which tank trucks are used to selectively spray a liquid along particular paths where the liquid may produce some beneficial result. Other vehicles, for example crop dusting planes and fire fighting planes, need an accurate system for control of fluid dissemination to insure effectiveness and avoid waste.

Selective control of the sequence, rate and pattern of flow from a plurality of spray valves is often necessary to minimize wastage of valuable fluid, or to minimize the time required to carry out the operation.

It is desirable that the sequence of opening and closing of the individual spray valves be easily controllable by a single operator from a central location, as in the cab of a spray truck.

Since such operations are often conducted in a sandy or dusty environment, it is also desirable to utilize individual spray valves so designed and fabricated as to minimize the possibility of malfunctions resulting from jamming of the valve mechanism by sand or dust.

It is, of course, also desirable to utilize a valve of simple design and few parts, so as to minimize the costs of construction, operations and repair.

One valve which has been previously used in tank truck spraying operations is that disclosed in the patent of Sons (U.S. Pat. No. 3,552,658), and was invented by one of the present applicants. This patent discloses a spray valve having a ram (FIG. 1, No. 98) which is moved by the application of compressed air so as to seal against an O-ring in the lower valve body member, shutting of the valve (Col. 4, lines 63–71).

In the Sons patent the ram of the spray valve is guided in the base of the valve head between two O-rings seated in the interior wall of the bore (Col. 3, lines 46–49; FIG. 1, Nos. 90, 92 and 100). The O-rings serve to prevent the control air pressure from leaking past the ram, down the bore. In application of this valve in spraying operations applicants have observed that the valve has a marked tendency to malfunction when used in a sandy environment, in that sand particles which find their way into the spray fluid frequently become wedged in the space between the outer wall of the ram and the interior wall of the valve head bore, particularly in the region of the two O-rings, thus jamming the ram mechanism. It will also be apparent that the valve of the Sons patent has more parts, and is accordingly more expensive to fabricate, than the valve described hereinbelow.

Applicants are aware of a type of valve presently manufactured by more than one manufacturer, not disclosed in any patent known to applicants, which is similar in some respects to the spray valve described hereinbelow. In this valve a rubber seating member is normally (when the valve is closed) held against a metal seating surface by a compressed spring. Application of increased pressure in the fluid being transmitted by the valve can override the spring, opening the valve. Application of control air pressure to a diaphragm connected to the rubber seating member can override the increased fluid pressure, and reclose the valve. However, this type of prior art valve does not exhibit various useful features of the spray valve disclosed herein by applicants, as described in detail hereinbelow.

Pressure controlled valves utilizing springs and diaphraghms are also disclosed in the patents of London (U.S. Pat. No. 998,019), Mintz (U.S. Pat. No. 1,035,803), Till (U.S. Pat. No. 1,779,056), Nelson (U.S. Pat. No. 1,861,506) and Welch (U.S. Pat. No. 3,038,488). However, the valves disclosed in these patents differ in one or more material respects from the valve disclosed hereinbelow. The valve in the patent of London has a spring but does not have a diaphragm, and is of a completely different geometry from the valve disclosed by applicants. The Mintz patent discloses a valve of a more complex form containing a porous medium for filtration of air (see FIG. 1, No. 23; Page 1, lines 60–64). The valve disclosed in the Till patent operates through rupture of a diaphragm which must then be replaced, unlike applicants' valve (See p. 1, lines 11–21; p. 3, lines 37–78). The patents of Nelson and Welch disclose valves of greater complexity and considerably different geometry from the valve disclosed by applicants hereinbelow.

SUMMARY OF THE INVENTION

The present invention encompasses apparatus for controlling the dissemination of fluid from a reservoir, through the operation, in any desired sequence, of a plurality of spray valves, and through control of the rate and direction of flow from each spray valve.

Each spray valve contains a one-piece diaphragm-seating member which is normally held in the valve-closed position by a compressed spring, and which is opened by enhanced spray fluid pressure produced by a pump, and which may be selectively closed during spraying operations by application of compressed air or other pressurized control fluid through control pressure lines leading to the individual spray valves, which are controlled by a single operator from a central location. The one-piece diaphragm seating member is easily replaceable for complete rebuilding of the spray valve.

Spray fluid is emitted directly from a spray orifice in the body of each spray valve, without additional fittings. A simple and readily adjustable control apparatus surrounding the body of the spray valve allows the operator to individually adjust the rates and patterns of flow from the individual spray valves.

One object of the present invention is the provision of a spray control apparatus utilizing valves of simple construction, having few parts, which are unlikely to malfunction when operated in a sandy or dusty environment.

Another object of the present invention is the provision of a spray control apparatus which may be easily controlled by a single operator.

Yet another object of the invention is the provision of a spray valve which is relatively simple in construction and effective in operation.

DESCRIPTION OF THE PREFERRED EMBODIMENT

1. Physical Structure

Figure 1:
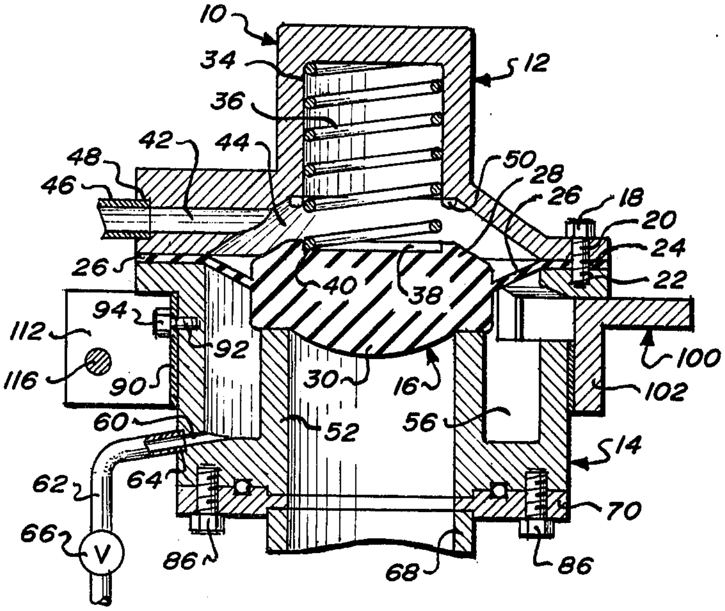
FIG. 1 is a side elevational section of an individual spray valve 10 of the present invention, in the fully closed position.

Referring now to FIGS. 1 through 5 of the drawings, wherein like reference numbers designate like or corresponding parts, reference number 10 designating the spray valve as a whole, the body of the spray valve 10 comprises an upper valve body 12 and a lower valve body 14, holding therebetween a diaphragm-seating member 16, the said parts being secured together by a plurality of bolts 18 secured in bolt holes 20 in the upper valve body 12, threaded bolt holes 22 in the lower valve body 14, and bolt holes 24 in the diaphragm-seating member 16.

Except to the extent modified by individual features described herein, the parts of the spray valve 10 are cylindrically symmetric about the longitudinal axis of the spray valve 10.

The diaphragm-seating member 16 is a single piece of rubber having three principal parts. The outer portion of the diaphragm-seating member 16 is a thin diaphragm 26 which is pliably and stretchably responsive to the application of air or other control fluid pressure to the upper surface of the diaphragm 26. The central portion of the diaphragm-seating member 16 is convex and considerably thicker than the diaphragm 26, with the upper portion of said central portion forming the spring seating member 28 and the lower portion forming the upper valve seating member 30. The upper valve seating member 30 has an upper valve seating surface 32, a flat annular surface around its outer perimeter.

The upper valve body 12 has a spring housing chamber 34, an axial cylindrical void, in which is housed a spring 36, which bears against the upper surface of the spring seating member 28, the spring 36 being seated against the spring seating member 28 in a spring seating recess 38, a shallow cylindrical recess in the upper surface of the spring seating member 28, so as to preclude horizontal motion of the lower end 40 of the spring 36 when the spray valve 10 is in the closed position, as in FIG. 1.

The upper valve body 12 has a control pressure port 42, a narrow cylindrical void for the admission of air or another suitable control fluid under pressure to a control pressure chamber 44, an axial void within the upper valve body 12, of the form of a frustrum of a cone, surrounding and communicating with the spring housing chamber 34. A control pressure line 46 is inserted and secured within a control line fitting recess 48 in the outer end of the control pressure port 42, through welding or other suitable processes capable of producing a pressurized fitting, which processes are well known in the art.

Figure 2:
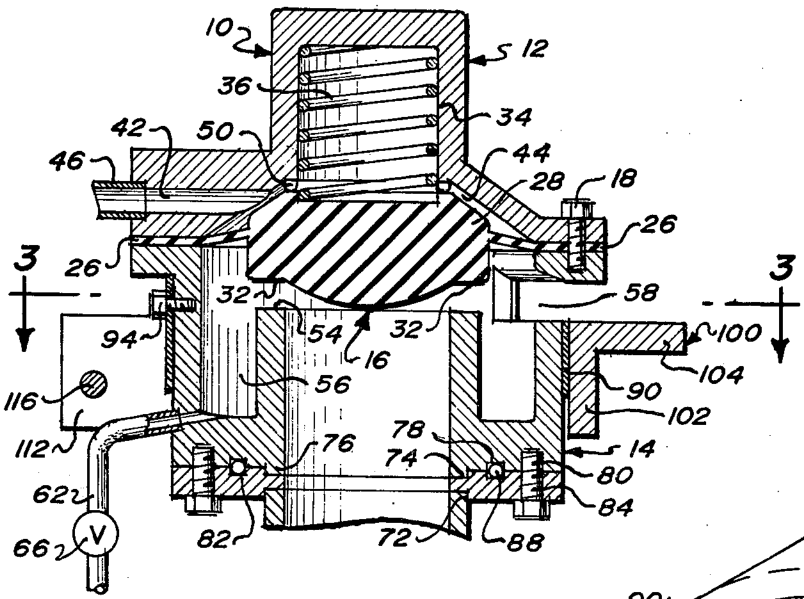
FIG. 2 is a side elevational section of the same spray valve 10 in the fully opened position.

Surrounding the lower end of the spring housing chamber 34 the upper surface of the control pressure chamber 44 has a plurality of small nodular stops 50 which serve to prevent the upper surface of the spring seating member 28 from making contact with the upper surface of the control pressure chamber 44 when the spray valve 10 is in the full open position indicated in FIG. 2. Thus, the control pressure chamber 44 maintains some finite volume, with communication to the control pressure port 42 and control pressure line 46, even when the spray valve 10 is in the full open position.

The lower valve body 14 has a spray conduit 52, an axial cylindrical void surrounded at its upper end by the lower valve seating surface 54, a flat annular surface having the same dimensions as upper valve seating surface 32. Surrounding the lower valve seating surface 54 the lower valve body 14 has a spray holding chamber 56, which can accommodate spray fluid which has exited the spray conduit 52 but has not yet exited the spray valve 10.

Figure 3:
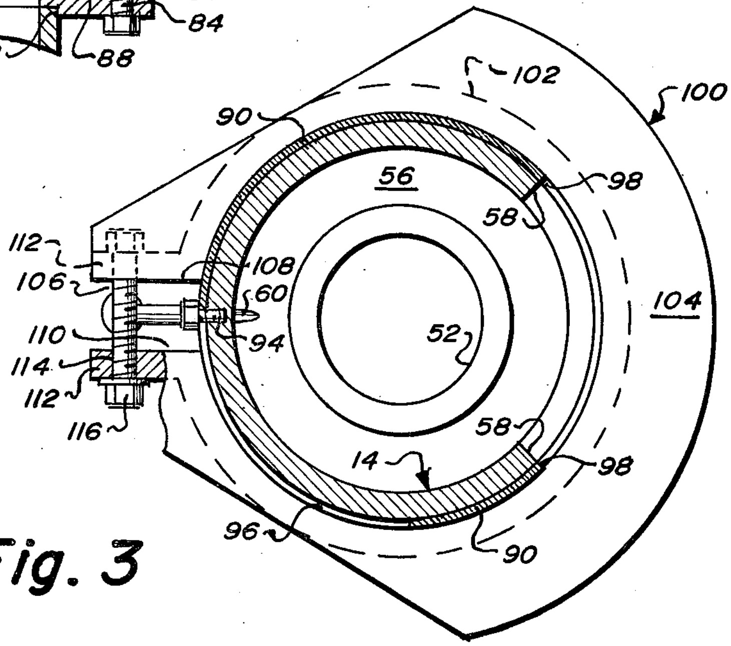
FIG. 3 is a sectional plan view of the same valve 10 taken along the line 3—3 in FIG. 2.

The upper exterior wall of the spray holding chamber 56, which is the upper outer wall of the lower valve body 14, has a spray orifice 58, the dimensions of which are defined by an arc of the cross section of the outer wall of the lower valve body 14, as indicated in FIG. 3, and a certain height of the spray orifice 58, in the direction parallel to the longitudinal axis of the spray valve 10, as indicated in FIG. 2.

Communicating with the bottom of the spray holding chamber 56 is a drain port 60, a narrow cylindrical void for drainage of excess spray fluid remaining within the spray holding chamber 56 at the conclusion of the spraying operations. A drain line 62 is inserted and secured within a drain line fitting recess 64 in the outer end of the drain port 60, through welding or other processes well known in the art. A drain valve 66 in the drain line 62 may be opened to drain such excess remaining spray fluid.

The spray conduit 52 of the lower valve body 14 communicates with a spray pipe 68 which conveys spray fluid to the spray valve 10. The spray pipe 68 is secured to the lower surface of the spray valve 10 by a mating flange 70, which may be welded to the end of the spray pipe 68, the spray pipe 68 being received within a cylindrical recess 72 in the lower surface of the mating flange 70. The upper surface of the mating flange 70 has a cylindrical recess 74 which receives a cylindrical alignment lip 76 on the lower surface of the lower valve body 14. The lower surface of the lower valve body 14 has an O-ring groove 78 and a plurality of threaded bolt holes 80. The mating flange 70 has an O-ring groove 82 and bolt holes 84 matching the O-ring groove 78 and the bolt holes 80, respectively, in the lower surface of the lower valve body 14. The mating flange 70 and spray pipe 68 are secured to the lower valve body 14 by bolts 86 secured in the bolt holes 80 and 84 in the lower valve body 14 and mating flange 70. An O-ring 88 seated in the O-ring grooves 78 and 82 forms a pressure seal preventing escape of spray fluid through the joint between the lower valve body 14 and the mating flange 70.

Surrounding the lower valve body 14 is the flow pattern adjustment sleeve 90, a cylindrical section of metal tubing having an inner radius forming a snug fit with the outer radius of the lower valve body 14. The lower valve body 14 has a bolt hole 92, accommodating a bolt 94 which secures the flow pattern adjustment sleeve 90 to the lower valve body 14 through an adjustment slot 96 in the flow pattern adjustment sleeve 90. The adjustment slot 96 lies along an arc of a circle formed by the intersection of a plane perpendicular to the axis of the flow pattern adjustment sleeve 90, with the surface of the flow pattern adjustment sleeve 90.

Figure 4:
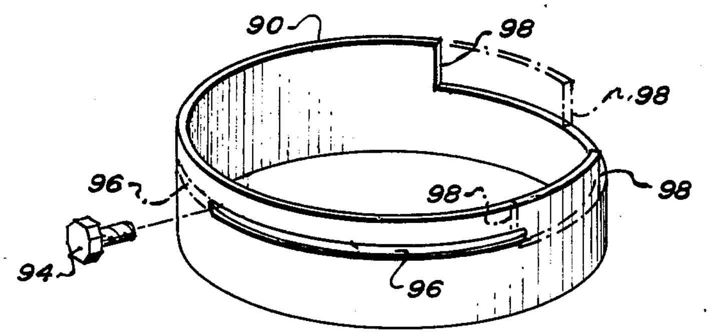
FIG. 4 is a perspective view of the flow pattern adjustment sleeve 90 of the spray valve 10.
Figure 5:
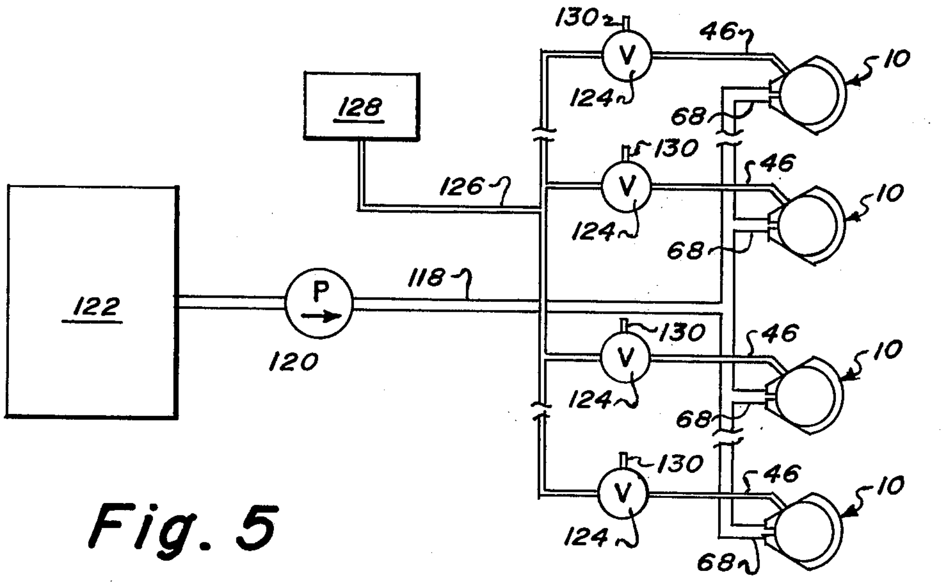
FIG. 5 is a schematic illustration of the entire spray control apparatus.

The cylindrical wall of the flow pattern adjustment sleeve 90 is cut away in a region defined by an arc of a circular cross section of the cylindrical wall, over a certain height from the top of the flow pattern adjustment sleeve 90, thus forming a spray pattern orifice 98. The spray pattern orifice 98 may be moved to various desired orientations, as indicated in FIG. 4, through rotation of the spray pattern adjustment sleeve 90 about the longitudinal axis of the spray valve 10.

Surrounding the flow pattern adjustment sleeve 90 in a snug fit is the duckbill 100. The duckbill 100 has a duckbill cylinder 102, a cylindrical section having an inner radius forming a snug fit with the outer radius of the flow pattern adjustment sleeve 90. At the upper end of the duckbill 100 is the duckbill plate 104, a plate in the form of a portion of an arc of a circle, with the central portion removed, with a circular hole of radius equal to the inner radius of the duckbill cylinder 102. On the side of the duckbill 100 toward the center of the circle defining the arc of the duckbill plate 104, the duckbill 100 has a clamping slot 106, comprising a longitudinal slot 108 in the duckbill cylinder 102 and a radial slot 110 in the duckbill plate 104, the said radial slot 110 being an extension of the said longitudinal slot 108. On either side of the clamping slot 106 the duckbill 100 has clamping plates 112, which are rectangular plates extending outward from the side of the duckbill 100, with long axes parallel to the longitudinal axis of the duckbill cylinder 102. The clamping plates 112 have bolt holes 114 and may be clamped together so as to lock the duckbill 100 in position, by insertion of a bolt 116 threaded into the bolt holes 114.

The flow pattern adjustment sleeve 90 and the duckbill 100 are shown to be manually adjustable but it will be understood that it is within the ability of one skilled in the art to provide a power actuated adjusting means whereby an operator can vary at will the spray pattern from a remote location.

The spray pipes 68 connected to the various spray valves 10 converge in a main spray pipe 118, leading to a pump 120, and thence to the spray fluid reservoir 122.

The control pressure lines 46 connected to the various spray valves 10 each lead to individual control pressure valves 124, thereafter converging in a main control pressure line 126, which leads to a control pressure source 128. Each control pressure valve 124 is a three-way valve having an exhaust port 130 to the atmosphere, which is open to the portion of the control pressure line 46 leading to the spray valve 10, when the control pressure valve 124 is in the closed position.

The pump 120 may be a conventional hydraulic pump, as in a form of the invention utilized by the applicants, or a conventional electric pump, connected to a convenient source of electric power, such as the battery of a tank truck, by wires and a switch, in a manner well known in the art. The control pressure valves 124 may be electrically operated valves of the type well known in the art, connected by wires to any convenient source of electric power, and may be controlled by an array of switches located at the position of the operator, as in the cab of a tank truck. In the preferred embodiment air is utilized as the control pressure medium, and the control pressure source 128 is an air compressor of the kind well known in the art, connected by wires and a switch to a convenient source of electric power.

2 Operation

Prior to beginning spraying operations the operator loosens the bolts 94 and 116, and adjusts the vertical position of the duckbill 100 to determine the effective height of the spray orifice 58 in the lower valve body 14, thereby determining the rate of flow of spray fluid for the individual spray valve 10. The operator also rotates the flow pattern adjustment sleeve 90 about the longitudinal axis of the spray valve 10, so as to determine the width and direction of the spray pattern emanating from the individual spray valve 10. The operator then tightens the bolts 94 and 116, locking the position of the duckbill 100 and the flow pattern adjustment sleeve 90.

The spring 36 housed within the upper valve body 12 of each spray valve 10 is of sufficient strength to urge the upper valve seating surface 32 against the lower valve seating surface 54, as shown in FIG. 1, with sufficient force to overcome the hydrostatic pressure of spray fluid in the spray fluid reservoir 122, so that each spray valve 10 remains closed against the hydrostatic pressure.

When it is desired to commence spraying operations the operator activates the pump 120, and spray fluid under the increased pressure resulting from operation of the pump 120 moves the upper valve seating surface 32 upward, overriding the action of the spring 36, allowing spray fluid to flow from the spray conduit 52 of the lower valve body 14, into the spray holding chamber 56 and thence outward from the spray valve 10 through the spray orifice 58 and spray pattern orifice 98.

If it is desired to selectively turn off a particular spray valve 10 during the spraying operation the operator turns on both the control pressure source 128 (an air compressor in the preferred embodiment) and the control pressure valve 124 in the control pressure line 46 leading to the spray valve 10 to be turned off. The pressure of compressed air in the control pressure chamber 44 and the spring housing chamber 34 of the upper valve body 12 of the spray valve 10 urges the diaphragm 26 and the upper valve seating member 30 downward. The air pressure in conjunction with the compression force exerted by the spring 36 overcomes the spray fluid pressure produced by the pump 120, bringing the upper valve seating surface 32 into contact with the lower valve seating surface 54, thus closing the spray valve 10. If it is later desired to reopen the same spray valve 10 the operator closes the corresponding control pressure valve 124, thus removing the air pressure in the control pressure chamber 44 and spring housing chamber 34, as the compressed air escapes to the atmosphere through the exhaust port 130 of the control pressure valve 124. Thereupon the spray fluid pressure generated by the pump 120 again overrides the compressive force of the spring 36, thus reopening the spray valve 10.

In the operation of the present invention the applicants have observed that the spray valve 10 may be operated in a sandy or dusty environment without jamming of the valve mechanism of the kind encountered with the valve described in the Sons patent, described hereinabove. The applicants have found that the rubber-to-metal valve seating of the upper valve seating surface 32 and the lower valve seating surface 54 is not impaired by the presence of sand or dust particles, and that these particles do not impede the necessary motions of the diaphragm 26 and other parts of the spray valve 10.

Applicants are aware of prior art valves having the following features of the spray valve 10 of the present invention: (1) a rubber seating member is normally held in the closed position against a metal seating surface by the action of a compressed spring; (2) the action of the spring may be overriden by increased spray fluid pressure, to open the valve; (3) application of control air pressure to a diaphragm connected to the rubber seating member overrides the increased spray fluid pressure, to again close the valve; (4) nodular stops such as the stops 50 of the present spray valve 10.

However the spray valve 10 of the present invention exhibits the following features not exhibited in combination in any prior art valve known to applicants: (1) the combination of the flow pattern adjustment sleeve 90 and duckbill 100, allowing ready individual adjustment of the rate and pattern of flow of spray fluid from each of the spray valves 10, not exhibited in any prior art spray valve known to applicant (although a duckbill is disclosed in the Sons patent); (2) the provision of the spray orifice 58 in the body of the spray valve 10 itself, immediately adjacent to the valve seat formed by the upper valve seating surface 32 and the lower valve seating surface 54, rather than in a separate fitting of the type which must be used with prior art spray valves known to the applicants, resulting in more direct outflow of the spray fluid and reduced expense for fabrication and maintenance of the spray control apparatus; (3) the molding of the diaphragm 26, the spring seating member 28 and the upper valve seating member 30 in a single piece of rubber, the diaphragm-seating member 16, rather than fabrication of these items as separate pieces as in prior art valves known to the applicants, resulting in savings of time and reduced expenses for fabrication, assembly, maintenance and repair of the spray valves 10.

Although air has been utilized as the control pressure fluid in the present invention, those skilled in the art will appreciate that in other applications it may be necessary or desirable to utilize other compressible fluids instead.

Although the spray valves 10 of the present invention have in the preferred embodiment been constructed of metal parts except as otherwise described hereinabove, those skilled in the art will also appreciate that plastic or other materials of adequate strength may be used instead.

Although the preferred embodiment utilizes rubber for the diaphragm-seating member 16, those skilled in the art will understand that many other pliable, stretchable materials might be substituted for rubber in particular applications of the present invention, without adversely affecting the operation of the invention.

Although the spray valve 10 of the present invention has been fabricated with a valve body having two parts, the upper valve body 12 and the lower valve body 14, those skilled in the art will appreciate that the spray valve 10 could be fabricated with a one-piece valve body. However the two piece valve body facilitates easy access to the diaphragm-seating mamber 16 and spring 36.

Although the embodiment of the invention disclosed herein utilizes bolts for securing the upper valve body 12 to the lower valve body 14, and for securing the mating flange 70 to the lower valve body 14, those skilled in the art will appreciate that these parts may be secured to one another instead by various types of clamps, by welding, or other means well known in the art, without affecting the essential characteristics of the present invention.

Those skilled in the art will appreciate that the present invention may be employed in configurations and operations other than those specifically disclosed herein, and that various changes and modifications other than those indicated above can be made in the invention without departing from the spirit and scope thereof. The essential characteristics of the invention are defined in the appended claims.

We claim:

1. Spray valve, comprising:

(a) An upper valve body comprising:
   (1) A spring housing chamber, a void within said upper valve body;
   (2) A control pressure chamber, a void within said upper valve body communicating with said spring housing chamber;
   (3) Control pressure port means for conveying a pressurized control fluid from outside said upper valve body into said control pressure chamber;

(b) First securing means, for securing said upper valve body to a lower valve body and a diaphragm-seating member;

(c) Said diaphragm-seating member, held between said upper valve body and said lower valve body by said first securing means, comprising:
   (1) An outer portion in the form of a thin diaphragm of pliable, stretchable material;
   (2) An upper convex central portion forming a spring seating member, having a spring seating recess, a shallow cylindrical recess in the upper surface of said spring seating member;
   (3) A lower convex central portion forming an upper valve seating member, having an upper valve seating surface, a flat annular surface around its outer perimeter;

(d) A spring, housed within said spring housing chamber of said upper valve body, with the lower end of said spring bearing against said spring seating member of said diaphragm-seating member, and being secured within said spring seating recess of said spring seating member;

(e) Said lower valve body, secured to said upper valve body and said diaphragm-seating member by said first securing means, comprising:
   (1) A spray conduit, a tubular void leading into said lower valve body, for transmission of spray fluid within said lower valve body;
   (2) A lower valve seating surface adjacent to the interior end of said spray conduit, being a flat annular surface having the same dimensions as said upper valve seating surface of said upper valve seating member of said diaphragm-seating member;
   (3) A spray holding chamber, a void communicating with said spray conduit when said upper valve seating surface is not in contact with said lower valve seating surface;
   (4) A spray orifice, an orifice in the wall of said lower valve body leading from said spray holding chamber to the outside of said lower valve body, for emission of spray fluid from said lower valve body;

(f) Second securing means, for adjustably securing a spray pattern control means to said lower valve body;

(g) Said spray pattern control means, adjustably secured to said lower valve body by said second securing means, for controlling the rate and pattern of flow of said spray fluid from said spray orifice when said spray valve is open.

2. The spray valve of claim 1, wherein said diaphragm-setting member is rubber and the other parts of said spray valve are metal.

3. Spray valve, comprising:

(a) An upper valve body comprising:

(1) A spring housing chamber, a cylindrical void within said upper valve body;

(2) A control pressure chamber, a void within said upper valve body surrounding and communicating with said spring housing chamber;

(3) Control pressure port means for conveying a pressurized control fluid from outside said upper valve body into said control pressure chamber;

(b) First securing means, for securing said upper valve body to a lower valve body and a diaphragm-seating member;

(C) Said diaphragm-seating member, held between said upper valve body and said lower valve body by said first securing means, comprising:

(1) An outer portion in the form of a thin diaphragm of pliable, stretchable material;

(2) An upper convex central portion forming a spring seating member, having a spring seating recess, a shallow cylindrical recess in the upper surface of said spring seating member;

(3) A lower convex central portion forming an upper valve seating member, having an upper valve seating surface, a flat annular surface around its outer perimeter;

(d) A spring, housed within said spring housing chamber of said upper valve body, with the lower end of said spring bearing against said spring seating member of said diaphragm-seating member, and being secured within said spring seating recess of said spring seating member;

(e) Said lower valve body, secured to said upper valve body and diaphragm-seating member by said first securing means, comprising:

(1) A spray conduit, a tubular void leading into said lower valve body from below, for transmission of spray fluid within said lower valve body;

(2) A lower valve seating surface surrounding the upper end of said spray conduit, being a flat annular surface having the same dimensions as said upper valve seating surface of said upper valve seating member of said diaphragm-seating member;

(3) A spray holding chamber, a void communicating with said spray conduit when said upper valve seating surface is not in contact with said lower valve seating surface;

(4) A spray orifice, an orifice in the wall of said lower valve body leading from said spray holding chamber to the outside of said lower valve body, for emission of spray fluid from said lower valve body;

(f) Second securing means, for adjustably securing a spray pattern control means to said lower valve body;

(g) Said spray pattern control means adjustably secured to said lower valve body by said second securing means, comprising:

(1) A flow pattern adjustment sleeve, a cylinder surrounding said lower valve body, having an inner radius forming a snug fit with the outer wall of said lower valve body, having a spray pattern orifice, which may be rotated to occlude a portion of said spray orifice in said wall of said lower valve body;

(2) A duckbill, having a duckbill cylinder surrounding said flow pattern adjustment sleeve, said duckbill cylinder having an inner radius forming a snug fit with the outer wall of said flow pattern adjustment sleeve, and having at one end thereof a duckbill plate, a flat plate with a circular hole of radius equal to the inner radius of said duckbill cyldinder, said duckbill being movable vertically along said lower valve body, so that a portion or all of said spray orifice in said lower valve body may be occluded by said duckbill plate and the wall of said duckbill cylinder.

4. The spray valve of claim 3, wherein said diaphragm-seating member is rubber and the other parts of said spray valve are metal.

5. Spray control apparatus, comprising:

(1) Pipe means for conveying fluid from a reservoir of fluid to be sprayed;

(2) Pressure generating means, communicating with said pipe means, for generating a pressure greater than ambient pressure within said fluid within said pipe means;

(3) At least one spray valve, connected to said pipe means, each such spray valve comprising:

(a) An upper valve body comprising:

(1) A spring housing chamber, a void within said upper valve body;

(2) A control pressure chamber, a void within said upper valve body communicating with said spring housing chamber;

(3) Control pressure port means for conveying a pressurized control fluid from outside said upper valve body into said control pressure chamber;

(b) First securing means, for securing said upper valve body to a lower valve body and a diaphragm-seating member;

(c) said diaphragm-seating member, held between said upper valve body and said lower valve body by said first securing means, comprising:

(1) An outer portion in the form of a thin diaphragm of pliable, stretchable material;

(2) An upper convex central portion forming a spring seating member, having a spring seating recess, a shallow cylindrical recess in the upper surface of said spring seating member;

(3) A lower convex central portion forming an upper valve seating member, having an upper valve seating surface, a flat annular surface around its outer perimeter;

(d) A spring, housed within said spring housing chamber of said upper valve body, with the lower end of said spring bearing against said spring seating member of said diaphragm-seating member, and being secured within said spring seating recess of said spring seating member;

(e) Said lower valve body, secured to said upper valve body and said diaphragm-seating member by said first securing means, comprising:

(1) A spray conduit, a tubular void leading into said lower valve body, for transmission of spray fluid within said lower valve body;

(2) A lower valve seating surface adjacent to the interior end of said spray conduit, being a flat annular surface having the same dimensions as said upper valve seating surface of said upper valve seating member of said diaphragm-seating member;

(3) A spray holding chamber, a void communicating with said spray conduit when said upper valve seating surface is not in contact with said lower valve seating surface;

(4) A spray orifice, an orifice in the wall of said lower valve body leading from said spray holding chamber to the outside of said lower valve body, for emission of spray fluid from said lower valve body;

(f) Second securing means, for adjustably securing a spray pattern control means to said lower valve body;

(g) Said spray pattern control means, adjustably secured to said lower valve body by said second securing means, for controlling the rate and pattern of flow of said spray fluid from said spray orifice when said spray valve is open.

6. Spray control apparatus, compromising:

(1) Pipe means for conveying fluid from a reservoir of fluid to be sprayed;

(2) Pressure generating means, communicating with said pipe means, for generating a pressure greater than ambient pressure within said fluid within said pipe means;

(3) at least one spray valve, connected to said pipe means, each such spray valve comprising:

(a) An upper valve body comprising:

(1) A spring housing chamber, a cylindrical void within said upper valve body;

(2) A control pressure chamber, a void within said upper valve body surrounding and communicating with said spring housing chamber;

(3) Control pressure port means for conveying a pressurized control fluid from outside said upper valve body into said control pressure chamber;

(b) First securing means, for securing said upper valve body to a lower valve body and a diaphragm-seating member;

(c) Said diaphragm-seating member, held between said upper valve body and said lower valve body by said first securing means, comprising:

(1) An outer portion in the form of a thin diaphragm of pliable, stretchable material;

(2) An upper convex central portion forming a spring seating member, having a spring seating recess, a shallow cylindrical recess in the upper surface of said spring seating member;

(3) A lower convex central portion forming an upper valve seating member, having an upper valve seating surface, a flat annular surface around its outer perimeter;

(d) A spring, housed within said spring housing chamber of said upper valve body, with the lower end of said spring bearing against said spring seating member of said diaphragm-seating member, and being secured within said spring seating recess of said spring seating member;

(e) Said lower valve body, secured to said upper valve body and said diaphragm-seating member by said first securing means, comprising:

(1) A spray conduit, a tubular void leading into said lower valve body from below, for transmission of spray fluid within said lower valve body;

(2) A lower valve seating surface surrounding the upper end of said spray conduit, being a flat annular surface having the same dimensions as said upper valve seating surface of said upper valve seating member of said diaphragm-seating member;

(3) A spray holding chamber, a void communicating with said spray conduit when said upper valve seating surface is not in contact with said lower valve seating surface;

(4) A spray orifice, an orifice in the wall of said lower valve body leading from said spray holding chamber to the outside of said lower valve body, for emission of spray fluid from said lower valve body;

(f) Second securing means, for adjustably securing a spray pattern control means to said lower valve body;

(g) Said spray pattern control means, adjustably secured to said lower valve body by said second securing means, comprising:

(1) A flow pattern adjustment sleeve, a cylinder surrounding said lower valve body, having an inner radius forming a snug fit with the outer wall of said lower valve body, having a spray pattern orifice, which may be rotated to occlude a portion of said spray orifice in said wall of said lower valve body;

(2) A duckbill, comprising a duckbill cylinder surrounding said flow pattern adjustment sleeve, said duckbill cylinder having an inner radius forming a snug fit with the outer wall of said flow pattern adjustment sleeve, and having at one end thereof a duckbill plate, a flat plate with a circular hole of radius equal to the inner radius of said duckbill cylinder, said duckbill being movable vertically along said lower valve body, so that a portion or all of said spray orifice in said lower valve body may be occluded by said duckbill plate and the wall of said duckbill cylinder.

* * * * *